United States Patent
Park et al.

(10) Patent No.: US 11,813,600 B2
(45) Date of Patent: *Nov. 14, 2023

(54) METHOD FOR PREPARATION GASEOUS-NITRIDATION TREATED OR LIQUID-NITRIDATION TREATED CORE-SHELL CATALYST

(71) Applicant: KOREA INSTITUTE OF ENERGY RESEARCH, Daejeon (KR)

(72) Inventors: Gu-gon Park, Daejeon (KR); Eun-jik Lee, Daejeon (KR); Dong-chul Park, Daejeon (KR); Sung-dae Yim, Daejeon (KR); Chang-soo Kim, Incheon (KR); Won-yong Lee, Daejeon (KR); Tae-hyun Yang, Daejeon (KR); Seok-hee Park, Daejeon (KR); Min-jin Kim, Daejeon (KR); Young-jun Sohn, Daejeon (KR); Byung-chan Bae, Daejeon (KR); Seung-gon Kim, Daejeon (KR); Dong-won Shin, Sejong-si (KR); Hwan-yeong Oh, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 268 days.

This patent is subject to a terminal disclaimer.

(21) Appl. No.: 16/767,721

(22) PCT Filed: Jul. 5, 2018

(86) PCT No.: PCT/KR2018/007665
§ 371 (c)(1),
(2) Date: May 28, 2020

(87) PCT Pub. No.: WO2019/107693
PCT Pub. Date: Jun. 6, 2019

(65) Prior Publication Data
US 2020/0346199 A1 Nov. 5, 2020

(30) Foreign Application Priority Data

Nov. 29, 2017 (KR) .................. 10-2017-0162255
Nov. 29, 2017 (KR) .................. 10-2017-0162256

(51) Int. Cl.
*B01J 37/02* (2006.01)
*H01M 4/90* (2006.01)
(Continued)

(52) U.S. Cl.
CPC .......... *B01J 37/0221* (2013.01); *B01J 21/18* (2013.01); *B01J 23/42* (2013.01); *B01J 23/75* (2013.01);
(Continued)

(58) Field of Classification Search
CPC ..... B01J 23/8913; B01J 23/892; B01J 35/008
See application file for complete search history.

(56) References Cited

U.S. PATENT DOCUMENTS

| | | | | |
|---|---|---|---|---|
| 2012/0328883 | A1* | 12/2012 | Hashimoto | H01G 11/22 977/773 |
| 2015/0147682 | A1 | 5/2015 | Kuttiyiel et al. | |
| 2018/0001385 | A1* | 1/2018 | Wang | B22F 1/054 |

FOREIGN PATENT DOCUMENTS

| | | | | |
|---|---|---|---|---|
| KR | 20130039456 A | * | 4/2013 | H01M 4/90 |
| KR | 10-2013-0123217 A | | 11/2013 | |

(Continued)

OTHER PUBLICATIONS

Kuttiyiel'2012, ( Nitride Stabilized PtNi Core-Shell Nanocatalyst for high Oxygen Reduction Activity, Nano Lett, 2012, 12 6266-6271.*

(Continued)

*Primary Examiner* — Jun Li
(74) *Attorney, Agent, or Firm* — NKL LAW; Jae Youn Kim

(57) ABSTRACT

The present disclosure is related to a method for preparing a gaseous- or liquid-nitridation treated core-shell catalyst (Continued)

and, more specifically, to a method for preparing a gaseous- or liquid-nitridation treated core-shell catalyst comprising steps of: nitridation-treating a transition metal precursor core and noble metal precursor shell particles in the presence of a gaseous nitrogen source; or forming a transition metal precursor core and noble metal precursor shell particles, by means of a liquid nitrogen source, and at the same time allowing the nitrogen source to bond with the transition metal precursor and thus allowing nitridation treatment. Therefore, the present disclosure allows a high nitrogen content in the core and thus enables a prepared catalyst to have excellent durability, a small average particle size and high degree of dispersion and uniformity, and thus to be suitable for the fuel cell field.

4 Claims, 10 Drawing Sheets

(51) Int. Cl.
| | |
|---|---|
| *B01J 23/755* | (2006.01) |
| *B01J 35/02* | (2006.01) |
| *B01J 21/18* | (2006.01) |
| *B01J 23/42* | (2006.01) |
| *B01J 23/75* | (2006.01) |
| *B01J 23/89* | (2006.01) |
| *B01J 35/00* | (2006.01) |
| *B01J 37/08* | (2006.01) |
| *B01J 37/16* | (2006.01) |
| *B01J 37/34* | (2006.01) |
| *H01M 4/92* | (2006.01) |

(52) U.S. Cl.
CPC .......... *B01J 23/755* (2013.01); *B01J 23/892* (2013.01); *B01J 23/8913* (2013.01); *B01J 35/002* (2013.01); *B01J 35/008* (2013.01); *B01J 35/0013* (2013.01); *B01J 35/02* (2013.01); *B01J 37/08* (2013.01); *B01J 37/16* (2013.01); *B01J 37/343* (2013.01); *H01M 4/92* (2013.01)

(56) References Cited

FOREIGN PATENT DOCUMENTS

| | | |
|---|---|---|
| KR | 10-1568247 B1 | 11/2015 |
| KR | 10-1580410 B1 | 12/2015 |

OTHER PUBLICATIONS

Kuttiyiel et al., Enhancement of the oxygen reduction on nitride stabilized Pt-M (M=Fe, Co and Ni) core-shell nanoparticle electrocatalysts, Nano Energy, vol. 13, Apr. 2015, pp. 442-449.*
Kurian A. Kuttiyeel et al., "Enhancement of the Oxygen Reduction on Nitride Stabilized pt-M (M= Fe, Co, and Ni) Core-shell Natioparticle Electrocatalysts", Nano Energy, 2015, pp. 442-449, vol. 13.
Ji-Hoon Jang et al. "One-pot synthesis of core-shell-like Pt3Co nanoparticle electrocatalyst with Pt-enriched surface for oxygen reduction reaction in fuel cells" Energy & Environmental Science., 2011, 4, pp. 4947-4953.

* cited by examiner

METHOD FOR PREPARATION GASEOUS-NITRIDATION TREATED OR LIQUID-NITRIDATION TREATED CORE-SHELL CATALYST

CROSS-REFERENCE TO RELATED APPLICATIONS

This application is the U.S. National Phase of International Patent Application No. PCT/KR2018/007665, filed on 7 May 2018, the contents of which are incorporated herein by reference in their entirety.

BACKGROUND

Technical Field

The present disclosure is related to a method for preparing a gaseous- or liquid-nitridation treated core-shell catalyst, more particularly to a method for preparing a core-shell catalyst having enhanced catalyst durability and electrochemical performance.

RELATED ART

In general, the fuel cell is in the limelight of a next-generation energy source, which is a device directly converting chemical energy generated by oxidation/reduction of fuel into electric energy. Recently, it has been expected as promising future electric power for transportation, such as the electric vehicle, and for domestic power supply. The electrode reaction in the fuel cell is made up of the hydrogen oxidation reaction dominating at the anode and the oxygen reduction reaction dominating at the cathode. In order to make these electrochemical reactions dominate in the fuel cell system, such as the polymer electrolyte membrane fuel cell and etc., driven at a low temperature, reaction rates are supposed to be increase effectively.

For the aforesaid reason, the conventional fuel cell system necessarily uses platinum (Pt) which is a noble metal catalyst. The platinum catalyst shows superior energy converting efficiency. Notwithstanding, Pt is a finite resource and the price thereof is very high, thus possibly impeding the widespread commercialization of the fuel cell. In particular, in terms of problems related to the Polymer electrolyte membrane fuel cell (PEMFC), the demand for high efficient and low cost of novel electrochemical catalysts has become the most pressing problem. In order to solve the aforementioned problems and to accelerate the commercialization of the fuel cell, studies for multi-component nanoparticles containing multiple components, such as alloy nanoparticles and core-shell nanoparticles have been made recently, whereby replacing the existing Pt electrode supported onto a carbon support. Such a method has drawbacks, such as, complicatedness in synthesis procedure and being uneconomical, unavoidable increases in particle size and loses in active surface area. Particularly, developed was the technique capable of minimizing decreases in catalytic performance by allowing a catalyst to be made up of a transition metal-based core and a Pt-based shell, compared to Pt catalysts. Notwithstanding, in this case, decreases in the catalyst durability limited the catalyst lifespan. Further, the nitrogen implantation technique for improving such a drawback still limited the content of nitrogen to be implanted into a core region. In addition, according to the prior art, following the preparation of a core, it is proceeding in such a sequence to add nitrogen to the core and then to coat a shell. This does not allow preparing the core and shell consecutively, thus resulting in lack of uniformity in shell thicknesses. Further, preparing processes thereof is complicated, thus requiring lots of time.

SUMMARY

Technical Problem

Therefore, the present disclosure is provided to solve the aforementioned problems. In an embodiment in accordance with the present disclosure, provided is an uncomplicated, efficient method for preparing a core-shell catalyst which is made up of a non-noble metal-based core and a Pt shell, and particularly of which catalyst lifespan is enhanced.

For this, in another embodiment in accordance with the present disclosure, provided is a method for preparing a core-shell catalyst, allowing a core to contain nitrogen in a high content, compared to the prior art.

Further, in another embodiment in accordance with the present disclosure, provided is a method for preparing a core-shell catalyst, allowing nitrogen to be contained in a core without increasing an average particle diameter, besides enhancing uniformity of the core and shell.

Technical Solution

According to a first aspect of the present disclosure, a method for preparing a gaseous-nitridation treated core-shell catalyst may include steps of irradiating ultrasonic waves to a solution including a reducing solvent, a noble metal precursor, a transition metal precursor and a carbon support, thus forming a cavity and forming transition metal precursor core and noble metal precursor shell particles due to a difference in vapor pressures; and nitridation treating the transition metal precursor core and noble metal precursor shell particles at a temperature of 250 to 550° C. in a pressure condition of 1 to 120 bars under a gaseous nitrogen source thus maintaining a nitrogen atom being in a molar ratio of 10 to 50 per 50 to 90 moles of the transition metal.

At this time, an average particle diameter of the gaseous-nitridation treated core-shell catalyst may be 5.0 nm or less.

The method for preparing a gaseous-nitridation treated core-shell catalyst is characterized in that the reducing solvent may have a reducing power at a high temperature of 130° C. or higher.

According to a second aspect of the present disclosure, a method for preparing a liquid-nitridation treated cores-shell catalyst may include steps: irradiating ultrasonic waves to a solution including a liquid nitrogen source, a reducing solvent, a noble metal precursor, a transition metal precursor and a carbon support; and forming a cavity by the ultrasonic irradiation and forming transition metal precursor core and noble metal precursor shell particles due to a difference in vapor pressure while nitridation treating the transition metal precursor by combining with the nitrogen source.

At this time, a nitrogen atom may be maintained in a molar ratio of 10 to 50 per 50 to 90 moles of the transition metal.

The method for preparing a liquid-nitridation treated core-shell catalyst is characterized in that the liquid nitrogen source may be a urea or ammonia solution or a mixture thereof, and an average particle diameter of the liquid-nitridation treated core-shell catalyst is 4.0 nm or less.

The method for preparing a liquid-nitridation treated core-shell catalyst is characterized in that the reducing solvent may have a reducing power at a high temperature of 130° C. or higher.

The method for preparing a liquid-nitridation treated core-shell catalyst is characterized in that the carbon support may be a porous support and the core-shell catalyst may be made up of a cobalt core and a platinum shell.

Advantageous Effects

According to the present disclosure, a method for preparing a gaseous- or liquid-nitridation treated core-shell catalyst is provided which allows contains a high content of nitrogen to be contained in a core, whereby the prepared catalyst has excellent durability, a small average particle size and high degrees of dispersion and uniformity.

Further, according to the present disclosure, a method for preparing a gaseous- or liquid-nitridation treated core-shell catalyst is provided of which preparation processes are easily carried out, whereby obtaining catalysts in large quantities.

Therefore, the core-shell catalyst according to the present disclosure will be expected to highly contribute the commercialization of fuel cells when being adopted, as an electrode catalyst having oxygen reduction reaction efficiency, thereto.

DETAILED DESCRIPTION

Best Mode

Figure 1:
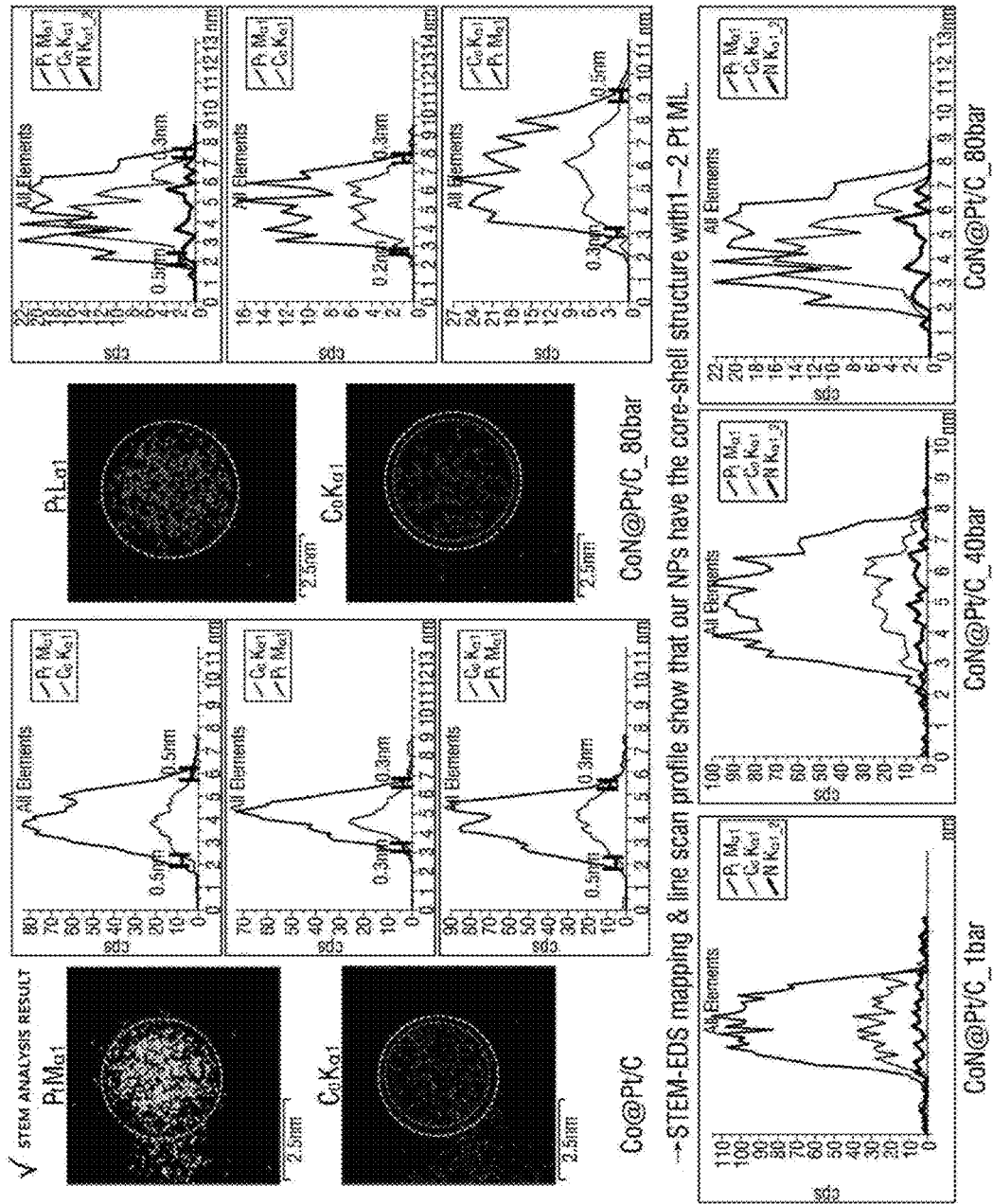
FIG. 1 shows STEM-EDS photos of core-shell catalysts prepared in embodiments 1 to 3 and comparison example 2 according to the present disclosure.

In association with an embodiment of the present disclosure, provided is a method for preparing a gaseous- or liquid-nitridation treated core-shell catalyst of which durability and electrochemical performance are enhanced.

It should not be understood that terminology and words used in the present specification and claims are limited to the general or dictionary meaning thereof. On a principled basis of the inventor is able to definite the notion of terminology appropriately, it should be preferably interpreted that the meaning and notion thereof coincide with the technical concept of the present disclosure.

Therefore, embodiments described in the present specification and configurations shown in drawings do not indicate all of the technical concept of the present disclosure but are just one preferable embodiment of the present disclosure. Thus, it should be understood that there are various equivalents and modification examples which are capable of replacing them at the time of filing the present application.

Hereinafter, a method for preparing a gaseous-nitridation treated core-shell catalyst is described in detail step by step as follows.

Firstly, ultrasonic waves are irradiated to a solution including a reducing solvent, a noble metal precursor, a transition metal precursor and a carbon support. High-frequency oscillation of the ultrasonic waves creates bubbles in a cavity, resulting in achieving oscillatory growth and ultimately allowing the cavity to be burst out when reaching to a specific size extent. A series of such processes caused by the irradiation of ultrasonic waves is referred to as 'acoustics cavitation mechanism'. A huge amount of heat energy approximating 5000K may be caused by cavity burst occurring at the last step of the acoustic cavitation mechanism, and extinction thereof is made up within an extremely short period of time, about $10^{-6}$ seconds.

If reactants of a chemical reaction involving irradiation of ultrasonic waves are two or more materials having a different vapor pressure, evaporation rates that the two or more reactants are evaporated into bubbles by high-frequency oscillation are different from each other, thus allowing controlling the structural and electrochemical feature of resulting materials using the same. For example, when irradiating ultrasonic waves and using two or more metal precursors as a precursor so as to prepare a nanoparticle including the two or more metals, dispersion of the two or more metal elements within the nanoparticle may be controlled according to a difference in vapor pressures between the two or more metal precursors. For example, a metal precursor having a low vapor pressure is positioned in a shell region within the nanoparticle while positioning a metal precursor having a high vapor pressure in a core region, thus obtaining a core-shell structured nanopaticle having a controlled element dispersion.

The reducing solvent is generally used one in the art and an organic matter without moisture and an oxygen source may be used as the reducing solvent. The solvent may have a reducing power particularly at a temperature of 70° C. or higher and more particularly at a temperature of 70° C. to approximately 400° C. and may be, for example, at least one kind of ethylene glycols selected from the group consisting of di-ethylene glycol, tri-ethylene glycol and poly-ethylene glycol. This reducing solvent plays a role in reducing a metal precursor that is a reactant within the cavity formed by treating ultrasonic waves and maintains a high boiling point, thus playing a role in forming an external liquid environment where the creation and extinction of cavities occur.

The noble metal precursor has a low vapor pressure, compared to a transition metal precursor. Following the formation of a transition metal seed particle and the increase in the size thereof, those capable of contributing galvanic replacement may be used. Particularly, the noble metal precursor is generally used one in the art. This is not defined specifically but may be at least one kind selected from the group consisting of an acetylacetonate precursor of the noble metal, a hexafluoroacetylacetonate precursor of the noble metal and pentafluoroacetylacetonate precursor of the noble metal.

The transition metal precursor is generally used one in the art. This is not defined specifically but may be at least one kind selected from the group consisting of nickel, cobalt, iron, copper and manganese precursors. The transition metal precursor may be, for example, at least one kind selected from the group consisting of an acethylacetonate precursor of the transition metal and a hexafluoroacetylacetonate precursor of the transition metal. This transition metal precursor may be volatilized rapidly by a high vapor pressure and captured in the cavity rapidly. According thereto, the transition metal may be positioned in a core region in a core-shell structure that is a reaction product.

The carbon support is generally used as a support of a core-shell catalyst in the art but not defined specifically. For example, a porous carbon support may be used. If using the porous carbon support, this may support more amount of core-shell structured nanoparticles efficiently due to an increased surface area.

Further, a metal oxide capable of supporting the core-shell structured nanoparticle may be used.

The reaction allows a reaction temperature to be maintained being 70° C. to 200° C. by heats generated by irradiating ultrasonic waves. That is, the reaction temperature is made up naturally by such the irradiation of the ultrasonic waves without additional heating.

The cavity is formed by irradiating ultrasonic waves according to the present disclosure, and the transition metal precursor is captured in the cavity prior to the noble metal precursor due to a difference in vapor pressures. Particularly, the transition metal precursor is volatilized earlier than the noble metal precursor, then being captured first in the cavity formed by irradiating ultrasonic waves. Then, the noble metal precursor is deposited on the core, thus forming a shell.

The core-shell catalyst according to the present disclosure decreases the unit cost of an electrode catalyst by positioning the transition metal in the core region and the noble metal, such as platinum, palladium and etc., is positioned in the shell region and has a high stability, thus increasing lifespan of the electrode catalyst. For example, the core-shell catalyst may be made up of a cobalt core and a platinum shell, or a nickel core and a platinum shell.

Next, particles of the transition metal precursor and noble metal precursor are nitridation treated at a temperature of 250 to 550° C. in a pressure condition of 1 to 120 bars under a gaseous nitrogen source, thus preparing a gaseous-nitridation treated core-shell catalyst.

The gaseous nitrogen source is generally used on in the art. This is not specifically defined but for example, ammonia may be used. A nitrogen atom is positioned in the transition metal core by such a gaseous-nitridation treatment, thus increasing durability of the catalyst. If the nitridation treatment temperature is lower than 250° C., enough nitridation effect is hardly expected, and if exceeding 550° C. the boundary thereof is unclear due to alloying between a core material and a shell, this may result in failing to maintain a core-shell shape.

Further, if the pressure is lower than 1 bar, this results in failing to introduce a predetermined amount or more of nitrogen into the core, and if exceeding 120 bar, this may be a cause of decreases in activity on oxygen reduction reaction of an electrode catalyst.

This gaseous-nitridation treatment allows maintaining a nitrogen atom being in a molar ratio of 10 to 50 per 50 to 90 moles of the transition metal.

Further, an average particle diameter of the core-shell catalyst gaseous-nitridation treated according to the present disclosure is 5.0 nm or less, a specific activity thereof is increased compared to platinum single metal, and a mass activity thereof is maintained being equal to the platinum single metal.

Meanwhile, hereinafter, a method for preparing a liquid-nitridation treated core-shell catalyst according to the present disclosure will be described in detail step by step as follows.

Firstly, ultrasonic waves are irradiated to a solution including a liquid nitrogen source, a reducing solvent, a noble metal precursor, a transition metal precursor and a carbon support. High-frequency oscillation of the ultrasonic waves creates bubbles in a cavity, resulting in achieving oscillatory growth and ultimately allowing the cavity to be burst out when reaching to a specific size extent. A series of such processes caused by the irradiation of ultrasonic waves is referred to as 'acoustics cavitation mechanism'. A huge amount of heat energy approximating 5000K may be caused by cavity burst occurring at the last step of the acoustic cavitation mechanism, and extinction thereof is made up within an extremely short period of time, about 106 seconds. If reactants of a chemical reaction involving irradiation of ultrasonic waves are two or more materials having a different vapor pressure, evaporation rates that the two or more reactants are evaporated into bubbles by high-frequency oscillation are different from each other, thus allowing controlling the structural and electrochemical feature of resulting materials using the same. For example, when irradiating ultrasonic waves and using two or more metal precursors as a precursor so as to prepare a nanoparticle including the two or more metals, dispersion of the two or more metal elements within the nanoparticle may be controlled according to a difference in vapor pressures between the two or more metal precursors. For example, a metal precursor having a low vapor pressure is positioned in a shell region within the nanoparticle while positioning a metal precursor having a high vapor pressure in a core region, thus obtaining the core-shell structured nanoparticle having a controlled element dispersion. The liquid nitrogen source is generally used one in the art but not defined specifically. For example, urea may be used. A nitrogen atom is positioned in the transition metal core by such a liquid-nitridation treatment, thus increasing durability of the catalyst. The liquid nitrogen source undergoes thermolysis or hydrolysis during the radiation of ultrasonic waves thus generating ammonia and reacts with the transition metal seed formed in the early reaction then being nitridation treated and allowing the nitridation treated transition metal to form a core.

The reducing solvent is generally used one in the art and an organic matter without moisture and an oxygen source may be used as the reducing solvent. The solvent may have a reducing power particularly at a temperature of 70° C. or higher, and more particularly at a temperature of 70° C. to approximately 400° C., and may be, for example, at least one kind of ethylene glycols selected from the group consisting of di-ethylene glycol, tri-ethylene glycol and poly-ethylene glycol. This reducing solvent plays a role in reducing a metal precursor that is a reactant within the cavity formed by treating ultrasonic waves and maintains a high boiling point, thus playing a role in forming an external liquid environment where the creation and extinction of cavities occur.

The noble metal precursor has a low vapor pressure, compared to a transition metal precursor. Following the formation of a transition metal seed particle and the increase in the size thereof, those capable of contributing galvanic replacement may be used. Particularly, the noble metal precursor is generally used one in the art. This is not defined specifically but may be at least one kind selected from the group consisting of an acetylacetonate precursor of the noble metal, a hexafluoroacetylacetonate precursor of the noble metal and pentafluoroacetylacetonate precursor of the noble metal.

The transition metal precursor is generally used one in the art. This is not defined specifically but may be at least one kind selected from the group consisting of nickel, cobalt, iron, copper and manganese precursors. The transition metal precursor may be, for example, at least one kind selected from the group consisting of an acethylacetonate precursor of the transition metal, and a hexafluoroacetylacetonate precursor of the transition metal. This transition metal precursor may be volatilized rapidly by a high vapor pressure and captured in the cavity rapidly. According thereto, the transition metal may be positioned in a core region in a core-shell structure that is a reaction product.

The carbon support is generally used as a support of the core-shell catalyst in the art but not defined specifically. For example, a porous carbon support may be used. If using the porous carbon support, this may support more amount of the core-shell structured nanoparticle efficiently due to an increased surface area.

Further, a metal oxide capable of supporting the core-shell structured nanoparticle may be used.

The reaction allows a reaction temperature to be maintained being 70° C. to 200° C. by heats generated by irradiating ultrasonic waves. That is, the reaction temperature is made up naturally by such the irradiation of the ultrasonic waves without additional heating.

The cavity is formed by irradiating ultrasonic waves according to the present disclosure, and the transition metal precursor is captured in the cavity prior to the noble metal precursor due to a difference in vapor pressures. Particularly, the transition metal precursor is volatilized earlier than the noble metal precursor, then being captured first in the cavity formed by irradiating ultrasonic waves. Then, the noble metal precursor is deposited on the core, thus forming a shell.

The core-shell catalyst according to the present disclosure decreases the unit cost of an electrode catalyst by positioning the transition metal in the core region and the noble metal, such as platinum, palladium and etc., is positioned in the shell region and has a high stability, thus increasing lifespan of the electrode catalyst. For example, the core-shell catalyst may be made up of a cobalt core and a platinum shell, or a nickel core and a platinum shell.

This gaseous-nitridation treatment allows maintaining a nitrogen atom being in a molar ratio of 10 to 50 per 50 to 90 moles of the transition metal.

Further, an average particle diameter of the core-shell catalyst gaseous-nitridation treated according to the present disclosure is 5.0 nm or less, a specific activity thereof is increased compared to platinum single metal, and a mass activity thereof is maintained being equal to the platinum single metal.

Hereinafter, in order to help understanding the present disclosure, provided are preferable embodiments. However, the below embodiments merely exemplify the present disclosure and it is obvious for those skilled in the art that various modifications and corrections are allowable within the scope of the present disclosure and the technical concept thereof. Further, it is reasonable that these modifications and corrections belong to the scope of the accompanying claims.

<Gaseous-Nitridation Treatment>

Embodiment 1

Ethyleneglycol, that is, a reducing solvent was added with a platinum acetylacetonate (Aldrich) solution, a cobalt acetylacetonate (Aldrich) solution and a porous carbon support (Vulcan XC72), followed by irradiating ultrasonic waves thereto by a high intensive ultrasonic probe (Sonic and Materials, model VC-500, amplitude 30%, 13 mm solid probe, 20 kHz) at a high temperature of 150° C. or higher for 3 hours under an argon atmosphere. The reaction temperature was naturally controlled by balance of heats generated by the ultrasonic waves and heat loss rates. Solid products obtained by irradiation of the ultrasonic waves were purified and rinsed with ethanol, followed by drying under a vacuum atmosphere. Then, the prepared solid products were treated with gaseous $NH_3$ at a temperature of 510° C., in a pressure condition of 1 bar, thus preparing a core-shell catalyst (CoNx@Pt/C).

Embodiment 2

This was carried out in the same fashion as the above embodiment 1, but a core-shell catalyst (CoNx@Pt/C) was prepared by treating with gaseous $NH_3$ in a pressure condition of 40 bar rather than 1 bar.

Embodiment 3

This was carried out in the same fashion as the above embodiment 1, but a core-shell catalyst (CoNx@Pt/C) was prepared by treating with gaseous $NH_3$ in a pressure condition of 80 bar rather than 1 bar.

<Liquid-Nitridation Treatment>

Embodiment 4

Ethyleneglycol, that is, a reducing solvent was added with urea, that is, liquid nitrogen source, a platinum acetylacetonate (Aldrich) solution, a cobalt acetylacetonate (Aldrich) solution and a porous carbon support (Vulcan XC72), followed by irradiating ultrasonic waves thereto by a high intensive ultrasonic probe (Sonic and Materials, model VC-500, amplitude 30%, 13 mm solid probe, 20 kHz) at a high temperature of 150° C. or higher for 3 hours under an argon atmosphere. At this time, the urea was used in the amount of 0.01 wt % per the ethyleneglycol. The reaction temperature was naturally controlled by balance of heats generated by the ultrasonic waves and heat loss rates. Solid products obtained by irradiation of the ultrasonic waves were purified and rinsed with ethanol, followed by drying under a vacuum atmosphere so as to prepare a core-shell catalyst (CoNx@Pt/C).

Embodiment 5

This was carried out in the same fashion as the above embodiment 1, but a core-shell catalyst (CoNx@Pt/C) was prepared by using 0.03 wt % of urea per ethyleneglycol.

Embodiment 6

This was carried out in the same fashion as the above embodiment 1, but a core-shell catalyst (CoNx@Pt/C) was prepared by using 0.05 wt % of urea per ethyleneglycol.

Comparison Sample 1

Commercial Pt/C catalyst (Johnson Matthey, HiSpec4000 product)

Comparison Sample 2

Ethyleneglycol, that is, a reducing solvent was added with a platinum acetylacetonate (Aldrich) solution, a cobalt acetylacetonate (Aldrich) solution and a porous carbon support (Vulcan XC72), followed by irradiating ultrasonic waves thereto by a high intensive ultrasonic probe (Sonic and Materials, model VC-500, amplitude 30%, 13 mm solid probe, 20 kHz) at a high temperature of 150° C. or higher for 3 hours under an argon atmosphere. At this time, the urea was used in the amount of 0.01 wt % per the ethyleneglycol. The reaction temperature was naturally controlled by balance of heats generated by the ultrasonic waves and heat loss rates. Solid products obtained by irradiation of the ultrasonic waves were purified and rinsed with ethanol, followed by drying under a vacuum atmosphere so as to prepare a core-shell catalysts (CoNx@Pt/C).

FIG. 1 shows STEM-EDS photos of core-shell catalysts prepared in embodiments 1 to 3 and comparison example 2 according to the present disclosure, allowing verifying that the catalysts of the embodiments 1 to 3 have 1~2 layered platinum shells (0.3-0.5 nm) definitely.

Figure 2:
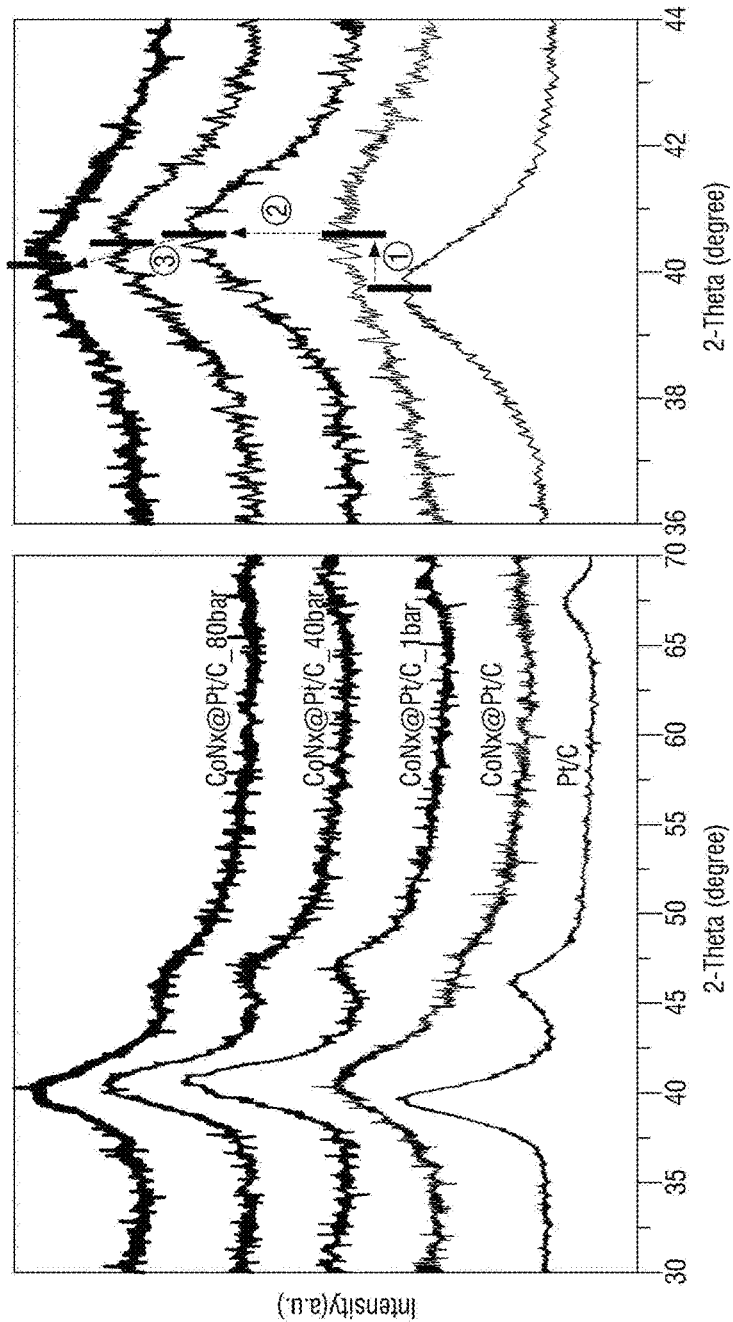
FIG. 2 shows XRD photos of core-shell catalysts prepared in embodiments 1 to 3 and comparison example 1 according to the present disclosure.

The following table 1 and FIG. 2 show analysis results of the structure of catalysts prepared in the embodiments 1 to 3 and the comparison examples 1 to 3.

TABLE 1

| Classification | Molar ratio | | Distance between | N content |
| --- | --- | --- | --- | --- |
| | Co | N | Pt-Pt | (wt %) |
| Embodiment 1 | 89.5 | 10.5 | 0.2717 | 0.15 |
| Embodiment 2 | 72.3 | 27.7 | 0.2726 | 0.60 |
| Embodiment 3 | 58.9 | 41.1 | 0.2743 | 0.99 |
| Embodiment 1 | — | — | 0.2780 | — |
| Embodiment 2 | — | — | 0.2713 | — |

Figure 3:
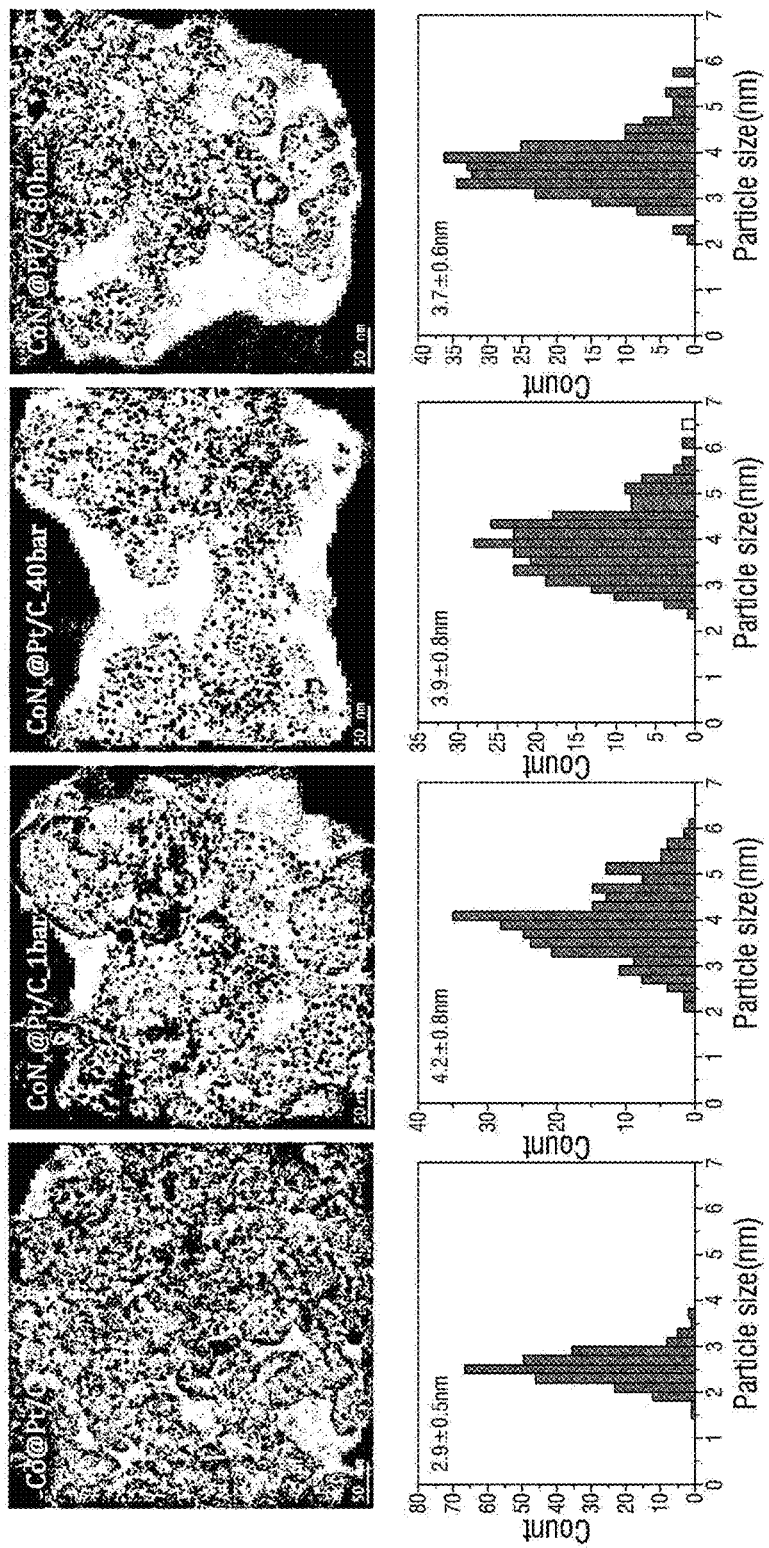
FIG. 3 shows particle size, dispersion and uniformity of core-shell catalysts prepared in embodiments 1 to 3 and comparison example 2 according to the present disclosure.
Figure 4:
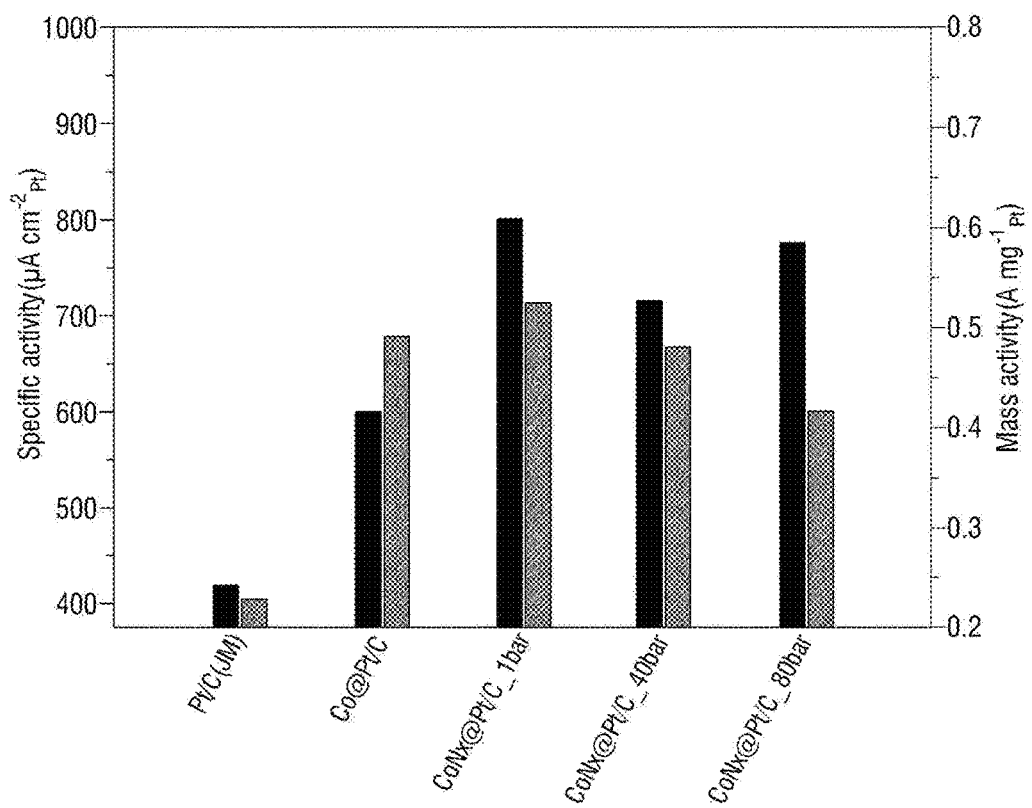
FIG. 4 shows specific activity and mass activity of core-shell catalysts prepared in embodiments 1 to 3 and comparison example 2 according to the present disclosure.
Figure 5:
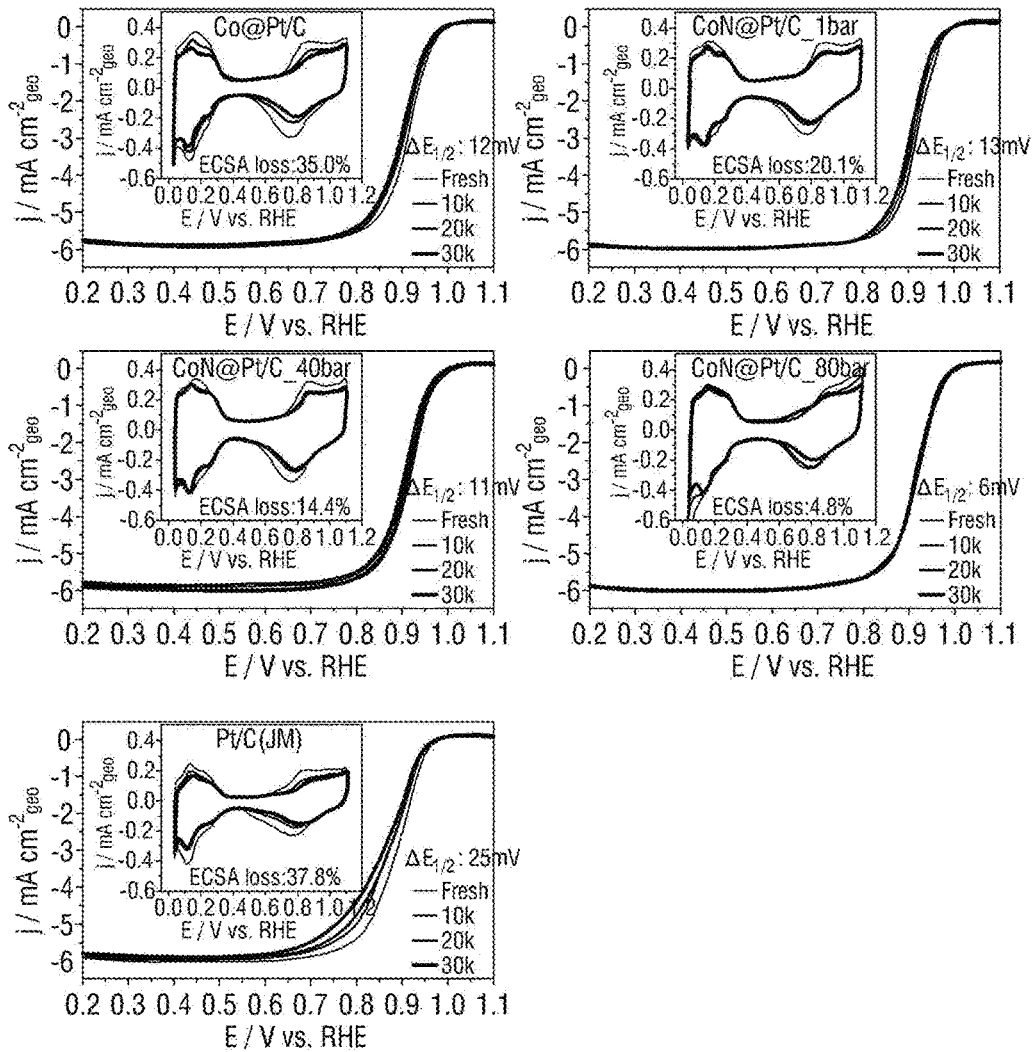
FIG. 5 shows Electrochemically Active Surface Area (ECSA) of core-shell catalysts prepared in embodiments 1 to 3 and comparison example 2 according to the present disclosure.

FIG. 3 shows particle size, dispersion and uniformity of core-shell catalysts prepared in the embodiments 1 to 3 and comparison example 2. An average particle diameter of the catalysts prepared in embodiments 1 to 3 is uniformly being 5.0 nm or less, and it is verified that these particles are dispersed on the carbon support. FIGS. 4 and 5 show the electrochemical performance of the core-shell catalysts prepared in the embodiments 1 to 3 and the comparison example 2. FIG. 4 shows specific activity and mass activity. FIG. 5 shows a comparison result of accelerated durability tests (0.6V to 1.0V, 30,000 cycles).

Further, verified is basic electrochemical activity enhanced through the nitridation process. Commercial platinum-based electrode catalysts have an Electrochemically Active Surface Area (ECSA) of 37.8% and a potential variance of oxygen reduction reaction of 25 mV during the same accelerated durability testing. On the other hand, according to the embodiment of the present disclosure, the CoNx@Pt/C catalyst prepared in a pressure condition of 80 bar has an extremely low activity decreased to the extent of 4.8% and a half-wave potential decreased to the extent of 6 mV, thus occupying greatly superior durability.

Figure 6:
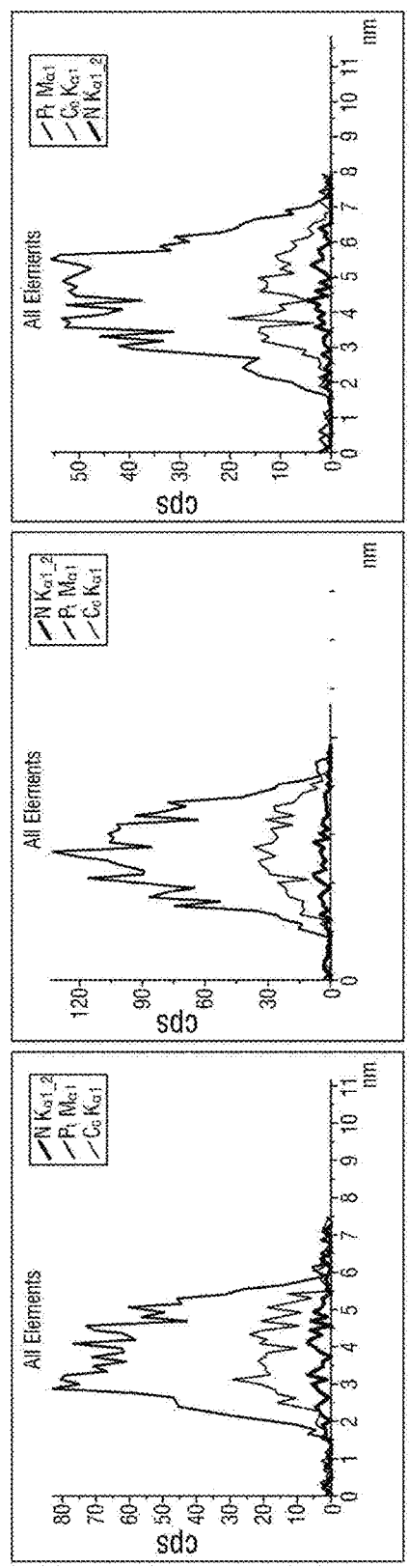
FIG. 6 shows STEM-EDS photos of core-shell catalysts prepared in embodiments 4 to 6 according to the present disclosure.

Meanwhile, FIG. 6 shows STEM-EDS photos of core-shell catalysts prepared in embodiments 4 to 6 according to the present disclosure, allowing verifying that the catalysts of the embodiments 4 to 6 have 1~2 layered platinum shells (0.3-0.5 nm) definitely.

Figure 7:
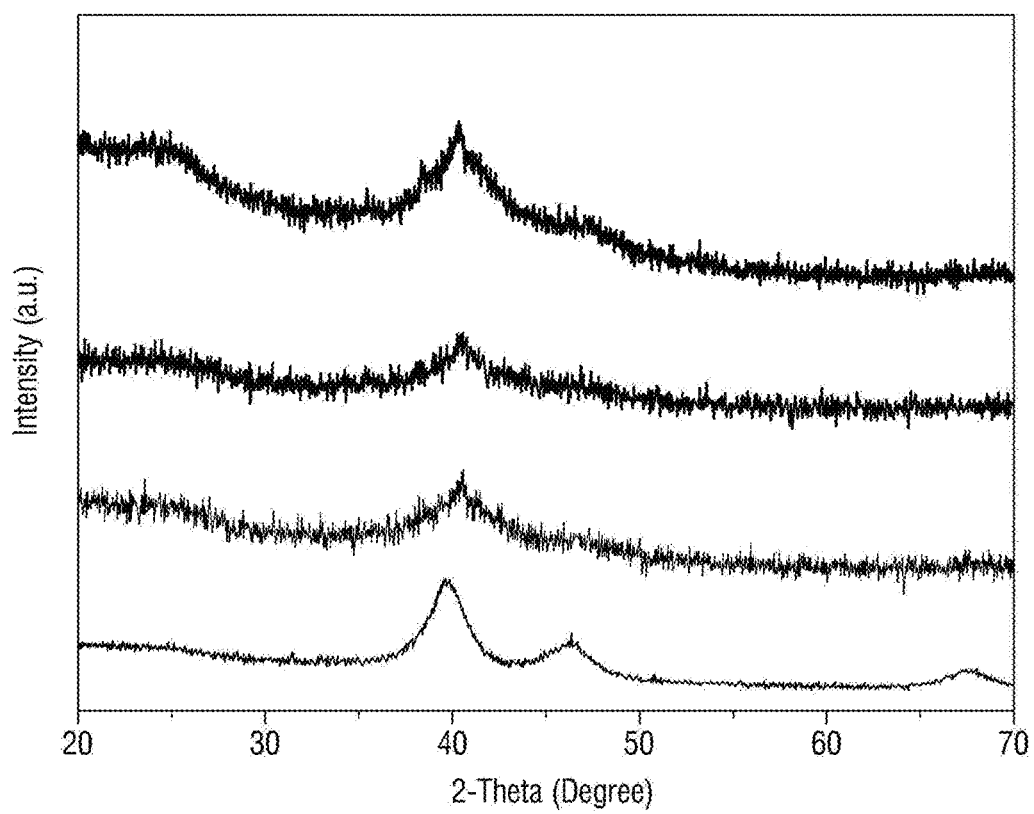
FIG. 7 shows XRD photos of core-shell catalysts prepared in embodiments 4 to 6 and comparison example 1 according to the present disclosure.

The following table 2 and FIG. 7 show analysis results of the structure of catalysts prepared in the embodiments 4 to 6 and the comparison examples 1.

TABLE 2

| Classification | Molar ratio | | Distance between | N content |
| --- | --- | --- | --- | --- |
| | Co | N | Pt-Pt | (wt %) |
| Embodiment 1 | 89.5 | 10.5 | 0.2717 | 0.15 |
| Embodiment 2 | 72.3 | 27.7 | 0.2726 | 0.60 |
| Embodiment 3 | 58.9 | 41.1 | 0.2743 | 0.99 |
| Embodiment 1 | — | — | 0.2780 | — |
| Embodiment 2 | — | — | 0.2713 | — |

Figure 8:
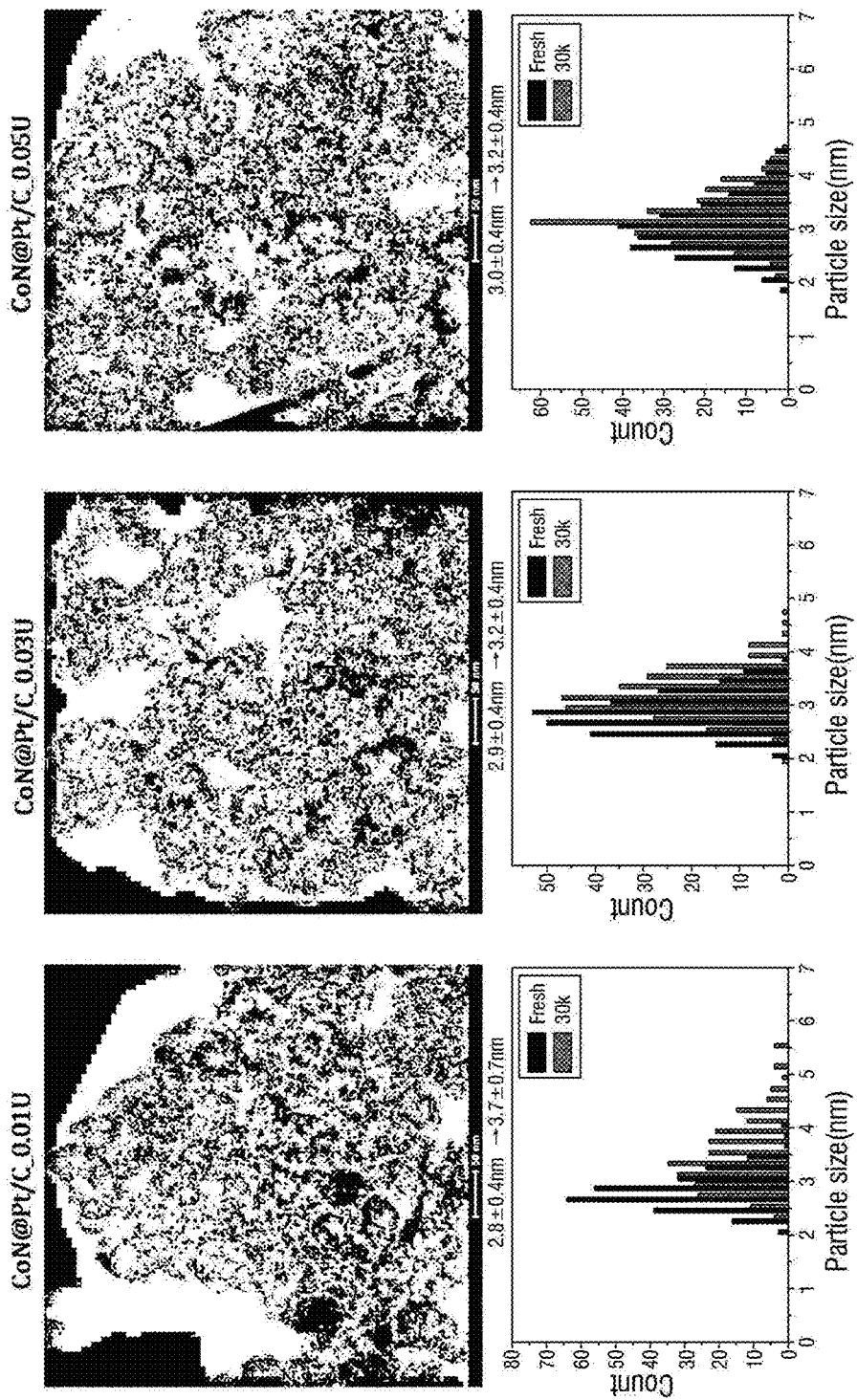
FIG. 8 shows particle size, dispersion and uniformity of core-shell catalysts prepared in embodiments 4 to 6 and comparison example 2 according to the present disclosure.
Figure 9:
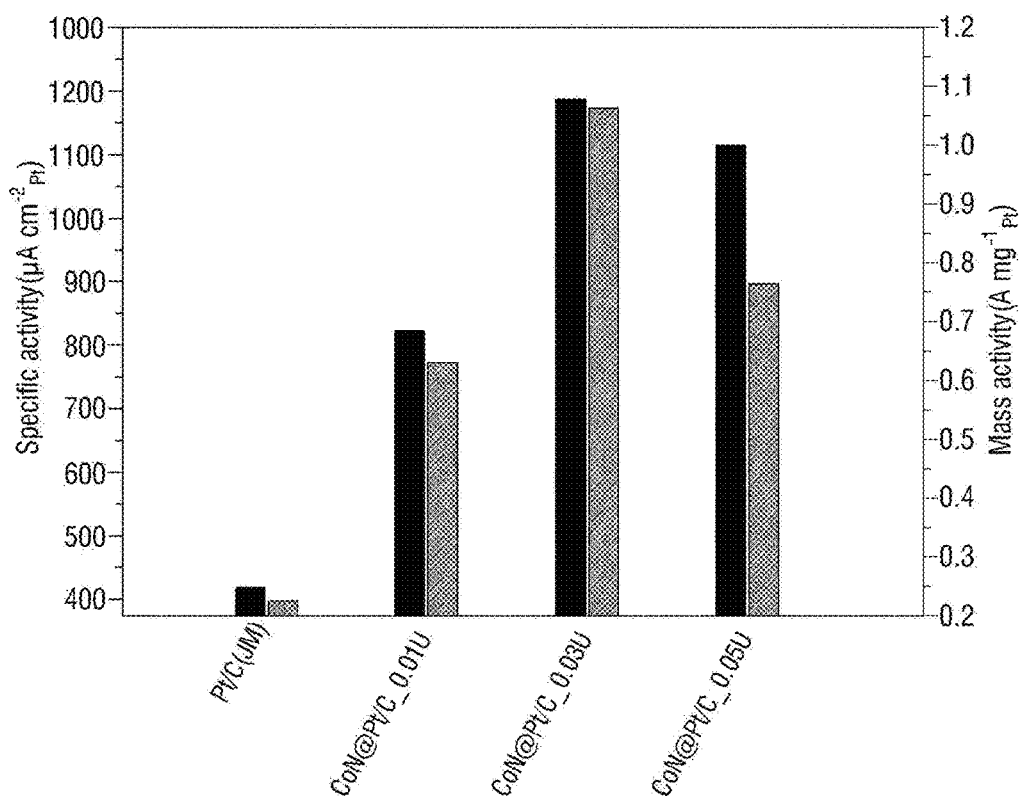
FIG. 9 show specific activity and mass activity of core-shell catalysts prepared in embodiments 4 to 6 and comparison example 2 according to the present disclosure.
Figure 10:
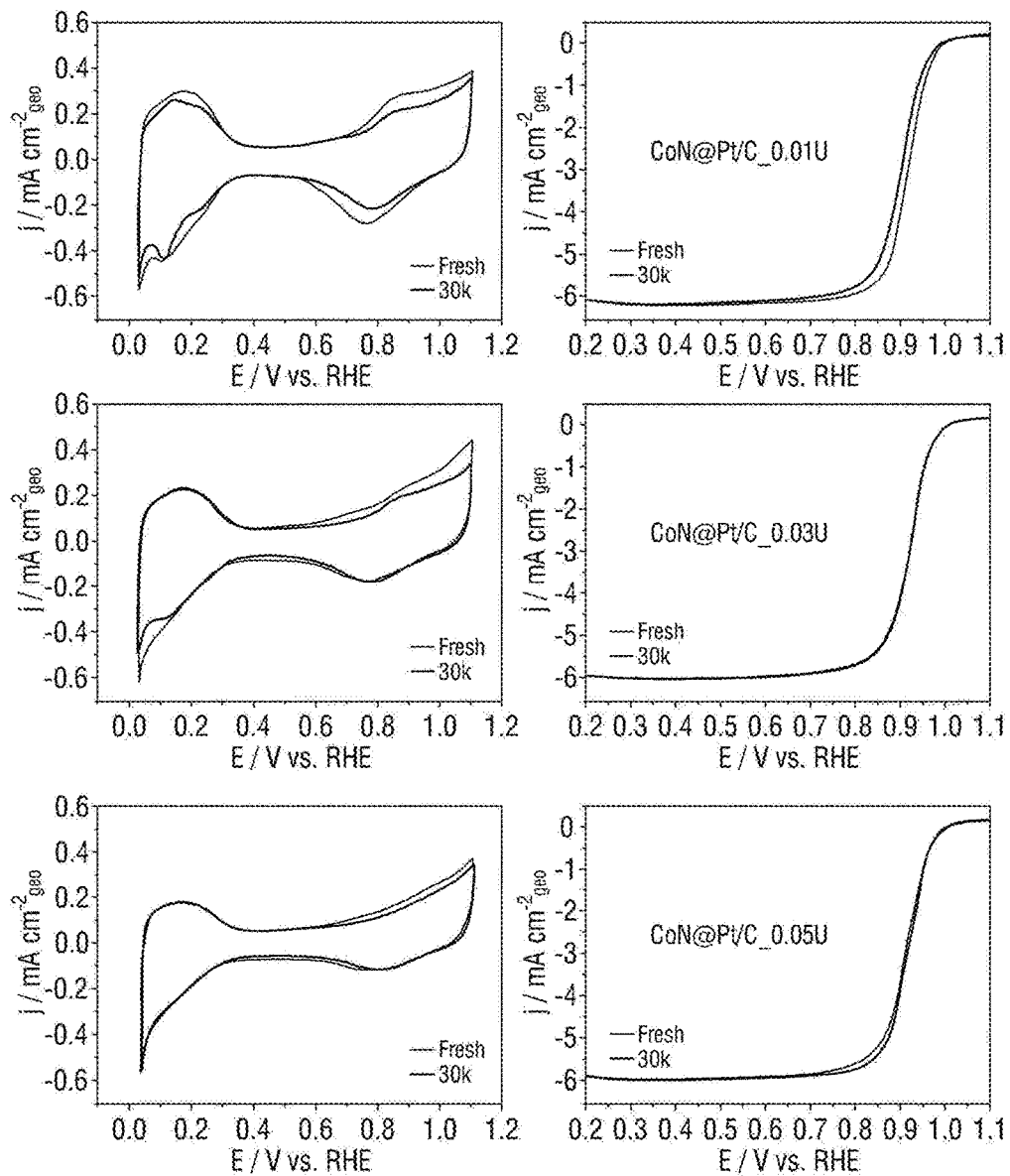
FIG. 10 shows Electrochemically Active Surface Area (ECSA) of core-shell catalysts prepared in embodiments 4 to 6 and comparison example 2 according to the present disclosure.

FIG. 8 shows particle size, dispersion and uniformity of core-shell catalysts prepared in the embodiments 4 to 6 and comparison example 2. An average particle diameter of the catalysts prepared in embodiments 4 to 6 is uniform being 4.0 nm or less, and it is verified that these particles are dispersed on the carbon support. FIG. 9 shows the electrochemical performance of the core-shell catalysts. FIG. 9 specific activity and mass activity in the embodiments 4 to 6 and the comparison example 1. FIG. 10 shows a comparison result of accelerated durability tests of the embodiments 4 to 6 (0.6V to 1.0V, 30,000 cycles).

Further, verified is basic electrochemical activity enhanced through the nitridation process. Commercial platinum-based electrode catalysts have an Electrochemically Active Surface Area (ECSA) of 37.8% and a potential variance of oxygen reduction reaction of 25 mV during the same accelerated durability testing. On the other hand, according to the embodiment 6 of the present disclosure, following the accelerated durability testing, an Electrochemically Active Surface Area (ECSA) is increased approximately 1.4% and a potential variance of oxygen reduction reaction is also increased approximately 4 mV, thus appearing extremely superior stability of the electrode catalysts.

The above description describes the technical concept of the present disclosure exemplarily, thus those skilled in the art will apprehend that various modifications and corrections are allowable within the scope of the basic feature of the present disclosure. Further, the patent scope of the present disclosure should be interpreted by the accompanying claims and all technical concepts within the scope equivalent thereto should be also interpreted as belonging to the patent scope of the present disclosure.

The invention claimed is:

1. A method for preparing a liquid-nitridation treated core-shell catalyst, the method comprising the steps of:
    irradiating ultrasonic waves to a solution including liquid-urea as a nitrogen source, a reducing solvent, a noble metal precursor, a transition metal precursor and a carbon support at 150 to 200° C.; and
    forming a cavity and forming transition metal precursor core and noble metal precursor shell particles due to a difference in vapor pressures while nitridation treating the transition metal precursor by combining with liquid-urea, to prepare a core-shell catalys, wherein
a nitrogen atom is maintained in a molar ratio 10.5 to 41.1 moles per 58.9 to 89.5 moles of the transition metal,
an average particle diameter of the prepared core-shell catalyst is 4.0 nm or less,
the transition metal precursor is at least one kind selected from the group consisting of an acethylacetonate precursor of the transition metal and a hexafluoroacetylacetonate precursor of the transition metal,
the noble metal precursor is at least one kind selected from the group consisting of an acetylacetonate precursor of the noble metal, a hexafluoroacetylacetonate precursor of the noble metal and pentafluoroacetylacetonate precursor of the noble metal, and
the reducing solvent has a reducing power at a high temperature of 70° C. or higher, and is at least one kind of ethylene glycols selected from the group consisting of di-ethylene glycol, tri-ethylene glycol and poly-ethylene glycol.

2. The method for preparing a liquid-nitridation treated core-shell catalyst according to claim 1, wherein the carbon support is a porous support.

3. The method for preparing a liquid-nitridation treated core-shell catalyst according to claim 1, wherein the core-shell catalyst is made up of a cobalt core and a platinum shell.

4. The method for preparing a liquid-nitridation treated core-shell catalyst according to claim 1, wherein the core-shell catalyst is made up of a nickel core and a platinum shell.

* * * * *